United States Patent
Hoffman et al.

(10) Patent No.: US 7,437,455 B2
(45) Date of Patent: Oct. 14, 2008

(54) METHOD FOR DETECTING A SYSTEM CONDITION

(75) Inventors: Rainer Hoffman, Langenfeld (DE); Armin Zaspel, Erfurt (DE)

(73) Assignee: EMKA Beschlagteile GmbH & Co. KG (DE)

( * ) Notice: Subject to any disclaimer, the term of this patent is extended or adjusted under 35 U.S.C. 154(b) by 728 days.

(21) Appl. No.: 11/211,683

(22) Filed: Jun. 3, 2005

(65) Prior Publication Data

US 2006/0045026 A1    Mar. 2, 2006

(30) Foreign Application Priority Data

Jun. 8, 2004    (DE)    .................. 10 2004 027 964

(51) Int. Cl.
*G06F 15/173* (2006.01)

(52) U.S. Cl. .................. 709/224; 709/202; 709/220; 709/223

(58) Field of Classification Search .................. 709/202, 709/220, 223, 224
See application file for complete search history.

(56) References Cited

U.S. PATENT DOCUMENTS

| | | | | |
|---|---|---|---|---|
| 5,491,796 | A | * | 2/1996 | Wanderer et al. ........... 709/224 |
| 5,774,669 | A | * | 6/1998 | George et al. ............... 709/224 |
| 5,913,037 | A | * | 6/1999 | Spofford et al. ............ 709/226 |
| 6,061,724 | A | * | 5/2000 | Ries et al. ................... 709/224 |
| 6,070,188 | A | * | 5/2000 | Grant et al. ................. 709/223 |
| 6,360,258 | B1 | * | 3/2002 | LeBlanc ...................... 709/223 |
| 6,363,421 | B2 | * | 3/2002 | Barker et al. ................ 709/223 |
| 6,718,137 | B1 | * | 4/2004 | Chin ............................ 398/3 |
| 6,721,791 | B1 | * | 4/2004 | Qiao ........................... 709/224 |
| 2001/0044822 | A1 | * | 11/2001 | Nishio ........................ 709/202 |

* cited by examiner

*Primary Examiner*—Michael Won
(74) *Attorney, Agent, or Firm*—Robert W. Becker & Assoc.; Robert W. Becker

(57) ABSTRACT

A method is provided for detecting a system condition of a system having at least one agent by means of at least one manager coupled with the agent, whereby agents and manager communicate with one another by means of SNMP protocol.

11 Claims, No Drawings

METHOD FOR DETECTING A SYSTEM CONDITION

This specification for the instant application should be granted the priority date of Jun. 8, 2004, the filing date of the corresponding German patent application 10 2004 027 964.0.

BACKGROUND OF THE INVENTION

The invention relates to a method for detecting a system condition of a system comprising at least one agent by means of at least one manager coupled with the agents, whereby agents and manager communicate with one another via SNMP protocol. The protocol standardized since 1988 and described in RFC1157, RFC1902 through 1907 is very common and for example is used frequently for monitoring complex IP-based networks. The Simple Network Management Protocol (SNMP) has been a standard protocol for the management of apparatus via an intermediate network since its introduction, independent of whether it operates as a LAN, WAN, or the Internet itself. It is currently the most-used management protocol for networks.

Within SNMP, two basic components are provided, and indeed agents and Network Management Systems (NMS). A device which can be administered contains software named an "agent". The agent is responsible for the determination and storage of information about the device, and in addition, for supplying this information to the NMS in an SNMP-compatible format. The advantage of SNMP is the simple implementation and manner of functioning. Information on this can be obtained by the practitioner also from HEIN, Mathias, GRIFFITHS, David: SNMP Simple Network Management Protocal Version 2.1 Edition, Bonn, International Thomson Publishing GmbH, 1994, pp. 340-341. Methods for detecting system condition are also described in U.S. Pat. No. 6,360,258 B1.

The SNMP protocol can be used for example in an ELM (Electric Locking Module) system in order to monitor the status in an ELM system (for example, door open/closed).

Such electrical closure module systems are described for example in DE 202 04 858 as a monitoring and control system for a control cabinet. There, a plurality of functional units is connected to a micro-processor, which must process a plurality of supplied function and control specifications with reference to the ELM system. With a complex ELM system, this means however that based on the few available commands in the SNMP protocol, the request of the variables takes place serially with the different agents through the manager. That is, the agents are serially cycled and the value of the individual variables are transmitted to the manger. As soon as the manager arrives at the last variable, the cycle starts over.

Thus, it follows that with a plurality of variables, a change of the system is first established with a substantial time delay by the manager and is indicated accordingly.

Therefore, it is the object of the present invention to reduce the reaction time upon changes of the status and to collectively make the system more effectively.

SUMMARY OF THE INVENTION

This object is solved for the above-noted method in that the following steps are provided:

each agent makes available parameters as SNMP variables and/or sum variables for request by the manager, which contain information about the device controlled, regulated or monitored by the agents.

each agent makes available additional validity variables for request by the manager, which contain validity information of each group of SNMP variables, whereby each change of the value of an SNMP variable in the group of SNMP variables simultaneously affects a change of the value of the associated validity variable.

each such group of SNMP variables can contain reference variables, which make reference to other groups, whereby each reference in turn is added to the validity variable of the related group.

By combining multiple variables to a sum variable using effective encoding, more variables can be transferred into a data set than is possible currently with SNMP. The concrete factor is dependent on different parameters; realistic values lie between approximately one and seven, typically between two to three. In the above-noted ELM system, it was determined that at least 400 SNMP data sets are reduced to approximately 200 data sets with each sum variable.

It is only necessary that either the agent or the manager is equipped program-technically so that they can read the variables contained in the sum variables, whereby the syntax for encoding the sum variable is not connected to the typical SNMP encoding.

By pairing a reference to one group or sum variable with the associated validity variable, the manager makes it possible to ignore a reference when the related group or sum variable already was read and its validity variable is unchanged, since in this case, the already read data are still valid. The concrete acceleration factor is dependent on different parameters; in the most favorable case, only a single group or sum variable is read regularly. In the above-noted ELM system, it was determined that of approximately 200 sum variables, a maximum of 12 are read regularly.

The selection of the variables which are associated with a group or sum variable is completely independent from the SNMP structure. Therefore, optimizing is possible, in which, respectively, such variables are combined whose values seldom change or those which change frequently. This has the result that in the first case, the entire group or sum variable need be read only seldom and in the second case, multiple value changes are detected simultaneously with high probability.

A further advantage of the method is that with use of the sum variables, its entire structure of agents is controlled so that the manager only requires a universal upgrade, which converts the sum variables back into the original SNMP variables. This upgrade then can be used for communication with any such agents. While the validity variable is incremented with a change of an SNMP variable of the corresponding sum variable, the validity information is accepted in a space-saving manner in the variables and the manager can recognize promptly by a comparison with the value of the validity information of the validity variable with the last request for information whether it must request the sum variables or not. In this manner, only those sum variables are invoked which contain an SNMP variable that changed since the last request by the manager.

With the feature that the most frequently required parameters are stored in the same sum variable, the absolute number of changed sum variables is reduced, which leads to further optimizing of the reaction times of the monitoring system.

A further advantage of the method with the use of the sum variables is that as a starting point for a complete request of the agent status, a single sum variable known to the manager is sufficient, which via reference and validity information contained therein, leads to all further groups of SNMP variables combined to sum variables, if necessary in multiple stages. As a result, it is also provided that the sum variable structure can be changed in agents without impact on the manager; only the starting point variable must remain obtainable under the same object identification identifier. A further advantage of the method is that it is compatible with the conventional SNMP.

This means that a manager, which is not upgraded accordingly, can communicate with the agents about the common variables, naturally more slowly. On the other hand, the manager can reconstruct the original variables from the read sum variables and subsequently process them like common variables.

In one embodiment of the invention, it is provided that the validity variable is of type integer and that its value is incremented with each change of the value of another variable of the group or sum variable.

In one embodiment of the invention, it is provided that the sum variable is a variable of the type octet-string. The information about the respective variable type is stored in a variable of type identifier. The variable saved in the sum variable can be of the type integer and octet-string. The variables stored in the sum variable can assume any other types, in particular all types common with SNMP. The validity variable is implemented as an independent type. For effective use of the provided storage space, special type-identifiers are used, with which extensive types and lengths are retained in one byte. Even more storage space can be saved within the sum variable, while in the sum variable a variable type-identifier known to the agents or manner is associated with the respective variable. This feature is improved further by the embodiment in which the variable type-identifier implicates the length of the variables.

Further advantages are provided from the feature that the object identification identifier for the variables is broken down into parts, which can be replaced individually from one variable to the next variable, whereby the actual value is always the sum of all parts. Therefore, it is sufficient to substitute only the part or parts of a variable which have changed compared to the previous variable. The predominant part of the object identification identifier with SNMP requires, inclusive of type recognition and length recognition, approximately 12 to 15 bytes; with the described features, this is reduced to approximately 3 bytes.

In a further embodiment of the invention, the variable type-indentifiers with variables that follow a variable with identical variable type-identifier within a sum variable are omitted, whereby the agent or manager is equipped program-technically, such that it changes automatically the missing variable type-identifier for processing before or after transmission of the variable from the agents to the manager. With this feature, efficiency and storage space savings is increased further.

Further advantages are provided from the feature that a special type identifier designates a block with a series of variables of the same type. Thus, the necessity for providing each individual variable of the block with its own type identifier is eliminated.

In a further embodiment of the invention, the sum variables of an agent have a hierarchical structure and each sum variable references to one or more subordinate sum variables, and if necessary, to a superordinate variable.

The basic manner of functioning of the SNMP protocol and the agents and manager is assumed to be known and is standardized and described in RFC1157 and RFC1902 through 1907.

DESCRIPTION OF SPECIFIC EMBODIMENTS

Further advantages and embodiments of the invention are provided in the following detailed description of an exemplary embodiment of the invention.

The method of the present invention is described next by way of example with reference to a monitoring system for electrical closure systems. In order to make possible monitoring of a complex system, it is necessary to collect parameters at various points of the system and conduct them to a central monitoring unit. For example, one such parameter is the information as to whether a door of an electrical closure module system is open or closed. For this purpose, a sensor is mounted on the door for example, which determines the respective status of the door with its associated agents. This status is stored in an SNMP variable, which in turn is saved in a sum variable. The manager responsible for these agents, among others, which is connected with these via a network, requests from the agents the variables of the series or targets them via an object identification identifier. Upon request, the agent transmits to the manager the sum variable in a response. By means of the validity information contained in the sum variable together with the reference to further (sum) variables of the agent, the manager can call up the next sum variable changed since the last request.

Each SNMP variable accordingly is associated with validity information in the corresponding sum variable, which contains reference information on the sum variable with the SNMP variable. The agent changes the respective corresponding validity information with a change of an SNMP variable.

Thus, the manager calls up selectively only the (sum) variables which contain changed validity information. Therefore, only those variables or sum variable are transmitted which contain changed validity information. Therefore, only those sum variables are transmitted to the manager by the agents which are changed since the last transmission to the manager.

The request cycle of an ELM system is shortened greatly by the noted feature, whereby a change of the ELM system, for example a parameter for the storage of the signal "door open/door closed", is displayed within a substantially shorter period of time. This parameter saved in an SNMP variable, which is registered by a door sensor on the door, is saved in an SNMP variable. As soon as a change of the parameter exists, the responsible agent changes the SNMP variable and the two associated validity variables, so that the manager follows the reference to the corresponding sum variable during the next cycle and requests the entire sum variable.

The change of a validity variable in a sum variable also causes a change of the validity variable in the superordinate sum variable referring to this sum variable.

The structure of the sum variable depends on the structure of the variables saved in the sum variable. The sum variable structure comprises one or more primary sum variables, which must be known by the SNMP manager and are to be requested cyclically. The primary sum variables contain reference to further sub-sum variables, which are additionally to be requested in the event change information exists. Each sub-sum variable in turn can contain reference to further sub-sum variables, so that a hierarchical structure exists.

Since the sub-sum variables are reached via reference in the superordinate sum variables and therefore need not be known explicitly by the SNMP manager, the sum variable structure in an SNMP agent can be changed without effect on the SNMP manager.

The sum variable is an SNMP variable of the type octet-string; that is, it is equipped such that the contained variables can be reconstructed. The reconstruction takes place with the manager, upon writing in the agents. After reconstruction of the original variables, these can be processed in the same manner as if they were read in the common manner.

The reconstruction takes place upon reading in the manager, upon writing in the agents. After reconstruction of the original variables, these can be processed as well as if they were read in the common manner.

The following features for encoding the sum variable lead to an effective use of the storage space made available within a variable. By means of the use of each variable type identifier with implicit length input, the still necessary length field can be eliminated. In addition, by combining the objection identification identifier from multiple parts, which can be changed individually, the constant repetition of the same objection identification identifier parts can be eliminated.

With a block field, which with variable lists avoids the constant repetition of the same variable type known values, the efficiency is increased again. So for example variable type known values of the same, successive variable types within a sum variable can be omitted. The agent interprets these then accordingly as with the preceding.

If a writing process is performed by the manager with agents, the above embodiments are provided reciprocally from the manager to the agents and vice versa.

The basic manner of functioning of the SNMP protocol and the agents and manager is assumed to be known and is standardized and described in RFC1157 and RFC 1902 through 1907.

The specification incorporates by reference the disclosure of German priority document 10 2004 027 964.0 filed Jun. 8, 2004.

The present invention is, of course, in no way restricted to the specific disclosure of the specification and drawings, but also encompasses any modifications within the scope of the appended claims.

The invention claimed is:

1. A method for detecting a system condition of a system comprising at least one agent by means of a manager coupled with the agents, whereby the at least one agent and manager communicate with one another by means of SNMP-protocol, the method comprising the following steps:

each at least one agent provides parameters as SNMP variables and/or sum variables for request by the manager, wherein said parameters include information about a device controlled, regulated or monitored by the at least one agent;

each at least one agent makes available additionally validity variables for request by the manger, wherein said validity variables include validity information, respectively, of a group of SNMP variables, whereby each change in a value of an SNMP variable in the group of SNMP variables simultaneously affects a change of a value of an associated validity variable; and each such group of SNMP variables can contain reference variables, wherein said reference variables make reference to other groups, whereby each reference in turn is added to the validity variables of the related group of SNMP variables, wherein an object identification identifier of each variable is broken down by the at least one agent into parts and same parts are omitted within a sum variable, wherein the at least one agent or manager is equipped in a program-technical manner, such that it automatically supplements missing parts for further processing before or after transmission of the variable from the at least one agent to the manager.

2. The method of claim 1, wherein each group of variables is combined to an individual sum variable.

3. The method of claim 1, wherein the validity variable is incremented with a change of an SNMP variable of the corresponding sum variable.

4. The method of claim 1, wherein frequently required parameters are saved in the same sum variable.

5. The method of claim 1, wherein the validity variable is of type integer, and wherein a value of the validity variable is incremented with each change of a value of another variable of the group of SNMP variables or sum variable.

6. The method of claim 1, wherein the sum variable is a variable of the type octet string.

7. The method of claim 1, wherein the variables saved in the sum variable can be of the type integer and octet-string and in the sum variable, a variable type identifier known by the agent or manager is associated with the respective variable.

8. The method of claim 1, wherein a variable type identifier implicates a length of the variables.

9. The method of claim 1, wherein an object identification identifier of each variable is broken down by the agents into parts and same parts are replaced within a sum variable by a shortened partial identifier for this part, wherein the shortened partial identifier of the agents is known, and wherein shortening also can comprise an omission of the parts.

10. The method of claim 7, wherein the variable type identifier, with variables that follow a variable with an identical variable type identifier within a sum variable, are omitted, wherein the at least one agent or manager is equipped in a program-technical manner, such that it automatically supplements missing variable type identifiers for further processing before or after transmission of the variable from the at least one agent to the manager.

11. The method of claim 1, in which the sum variable of one of the at least one agent has a hierarchal structure and each sum variable refers to at least one subordinate sum variable and if necessary to a superordinate sum variable.

* * * * *